United States Patent
Mukai et al.

[11] Patent Number: 5,888,084
[45] Date of Patent: Mar. 30, 1999

[54] ROTARY CONNECTOR

[75] Inventors: Yasuhiko Mukai; Seiichi Ueno; Masato Miyahara, all of Tokyo, Japan

[73] Assignee: The Furukawa Electric Co., Ltd., Tokyo, Japan

[21] Appl. No.: 908,414

[22] Filed: Aug. 7, 1997

[30] Foreign Application Priority Data

Aug. 9, 1996 [JP] Japan ................................. 8-211336

[51] Int. Cl.⁶ ................................................ H01R 35/04
[52] U.S. Cl. ............................................... 439/164; 439/15
[58] Field of Search ........................................ 439/164, 15

[56] References Cited

U.S. PATENT DOCUMENTS

| | | | |
|---|---|---|---|
| 5,174,515 | 12/1992 | Meier | 439/164 |
| 5,224,871 | 7/1993 | Ida et al. | 439/164 |
| 5,277,604 | 1/1994 | Ida et al. | 439/164 |
| 5,637,005 | 6/1997 | Bannai et al. | 439/164 |

FOREIGN PATENT DOCUMENTS 4-355085  12/1992  Japan.

*Primary Examiner*—Gary Paumen
*Attorney, Agent, or Firm*—Armstrong, Westerman, Hattori, McLeland & Naughton

[57] ABSTRACT

A rotary connector having a mutually rotatable inside case and outside case and having a flat cable with one end fixed to the inside case and the other end fixed to the outside case inserted in the space therebetween. A plurality of annular belts are inserted in the circumferential direction to bias the turnabout portion of the flat cable to prevent the flat cable from becoming loose and rattling in the space. Contact prevention members are inserted between the adjoining annular belts to prevent the adjoining annular belts from coming into direct contact with each other and to smooth the rotation of the rotary connector.

10 Claims, 5 Drawing Sheets

ROTARY CONNECTOR

BACKGROUND OF THE INVENTION

1. Field of the Invention

The present invention relates to a rotary connector accommodating a cable used for transmitting electric signals, optical signals, etc. between a rotary body and a fixed body.

2. Description of the Related Art

One method proposed for laying a cable which is used for supplying power or transmitting signals through a rotary portion such as the steering wheel of a car has been for example to connect one cable to an inside case of a rotary connector of a rotatable structure and connect another cable to the outside case. The inside case and the outside case are rotatable with respect to each other and a cable is provided between the inside case and outside case for intermediate connection.

In the past, the intermediate connection cable of a rotary connector would strike the inside of the rotary connector when vibration occurred. The noise caused by this was disturbing and prompted measures to be taken against it. Further, measures have been taken to prevent the intermediate connection cable from becoming loose between the inside case and outside case or from being subjected to excessive tension.

Such a rotary connector of the related art will be explained in more detail here with reference to FIG. 1 and FIG. 2. FIG. 1 is a lateral sectional view of a rotary connector of the related art, while FIG. 2 is a sectional view along the line D—D of the same. In this rotary connector, the inside case 1 and outside case 2 are arranged to be rotatable relative to each other. A flat cable 3 is accommodated in the space formed between the inside case 1 and the outside case 2 in a spiral fashion. One end of the flat cable 3 is fixed to the inside case 1, while the other end is fixed to the outside case 2. Note that in the space formed between the inside case 1 and the outside case 2, there is a U-shaped turnback portion 3A comprised of the flat cable turned back in a U-shape. In the space 4 formed by this turnback portion 3A, a plurality of annular belts 5 are arranged.

Explaining how this rotary connector is used, for example, the inside case 1 is turned so as to wind the part of the flat cable 3 wound against the outside case 2 on the inside case 1 or wind the part of the flat cable 3 wound on the inside case 1 at the outside case 2 (rewind from the inside case 1). The plurality of annular belts 5 arranged in the space 4 formed by the turnback portion 3A of the flat cable 3 bias the part of the flat cable 3 wound on the inside case 1 and the part of the flat cable 3 wound against the outside case 2 away from the belts so as to prevent the part of the flat cable 3 wound on the inside case 1 and the part of the flat cable 3 wound against the outside case 2 from becoming loose and to enable smooth winding and rewinding of the flat cable 3.

In the above-mentioned rotary connector, however, when the inside case 1 is turned in an X-direction (counterclockwise direction) as shown in FIG. 1, since the directions of rotation of the adjoining annular belts 5 biasing the part of the flat cable 3 wound on the inside case 1 and the part of the flat cable 3 wound against the outside case 2 away from the belts are the same, the directions of rotation of the annular belts 5 where they contact each other end up becoming opposite from each other. Therefore, since each of the annular belts 5 are moved to the direction of the rotation of the inside case 1, the rotational torque becomes large and smooth rotation is no longer possible. Note that a similar problem occurs also in a case where the inside case 1 is turned in the clockwise direction.

SUMMARY OF THE INVENTION

An object of the present invention is to provide a rotary connector which ensures smooth rotation between the inside case and outside case and smooth winding and rewinding of a long object such as a flat cable.

Another object of the present invention is to provide a rotary connector which is easy to manufacture, and is inexpensive in manufacturing costs.

Still another object of the present invention is to provide a rotary connector which is not noisy.

According to the present invention, there is provided a rotary connector provided with an inside case having an outer circumference of a circular cross-section and a flange perpendicular to the outer circumference; an outside case having an inner circumference of a circular cross-section arranged facing the outer circumference of the inside case a predetermined distance away from the same and a flange perpendicular to the inner circumference and positioned facing the flange of the inside case, surrounding the inside case, and arranged to be rotatable relative to the inside case; a space having a cross-section defined by the circular cross-section outer circumference of the inside case, the flange of the inside case, the circular cross-section inner circumference of the outside case, and the flange of the outside case and extending annularly along the circumferential direction of the inside case and the outside case; a long object having one end fixed to the inside case, having another end fixed to the outside case, turned back in a U-shape inside the space, and accommodated in the space in a manner winding on the outer circumference of the inside case and enabling winding at the inner circumference of the outside case; a plurality of annular belts provided in the space along the outer circumference of the cylindrical inside case for biasing the parts of the long object wound on the inside case or the outside case to a direction of outer circumference of the inside case and the inner circumference of the outside case in the space to prevent looseness of the long object in the space; and contact prevention members provided between adjoining annular belts for preventing adjoining annular belts from coming into direct contact with each other.

By arranging the contact prevention members between the plurality of annular belts to prevent the annular belts from directly contacting each other, the annular belts no longer interfere with each other. For this reason, the rotary connector can be smoothly turned.

Preferably, the long object is a flat cable.

Preferably, the annular belt has a predetermined elasticity and is produced so as to be able to deform between the outer circumference of the inside case and the inner circumference of the outside case and between the contact prevention members at the time of application of stress.

Further, preferably, the portion of a contact prevention member contacting an annular belt is formed by a material having rigidity so as not to deform by the stress of the adjoining annular belt.

The contact prevention member may take various forms.

BRIEF DESCRIPTION OF THE DRAWINGS

These and other objects and features of the present invention will become more apparent from the following description of the preferred embodiments given with reference to the attached drawings, in which.

DESCRIPTION OF THE PREFERRED EMBODIMENTS

Below, the present invention will be explained in detail by referring to drawings.

First Embodiment

Figure 3:
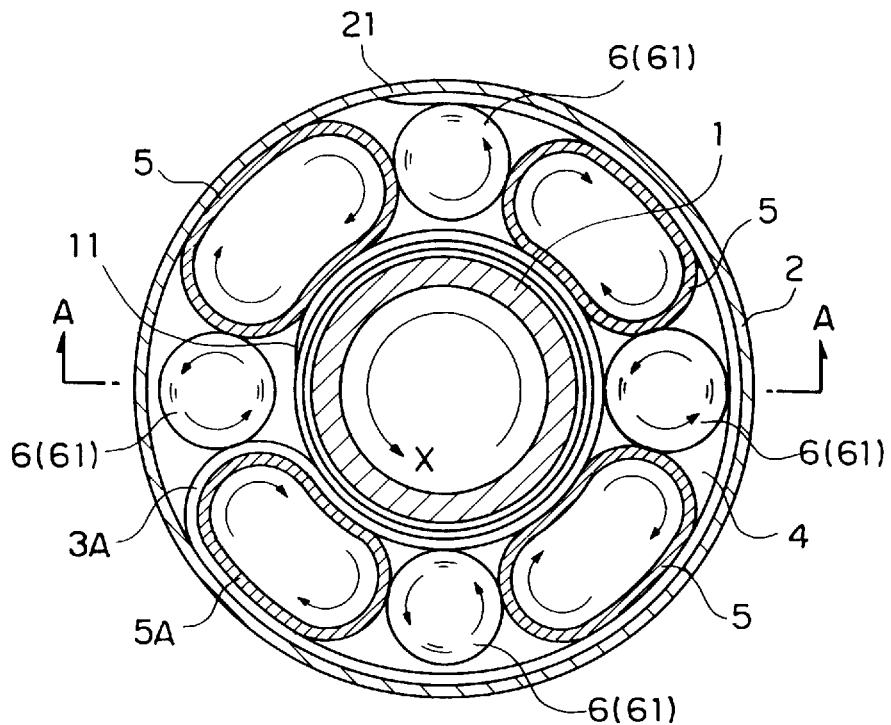
FIG. 3 is a lateral sectional view of a first embodiment of a rotary connector according to the prevent invention.
Figure 4:
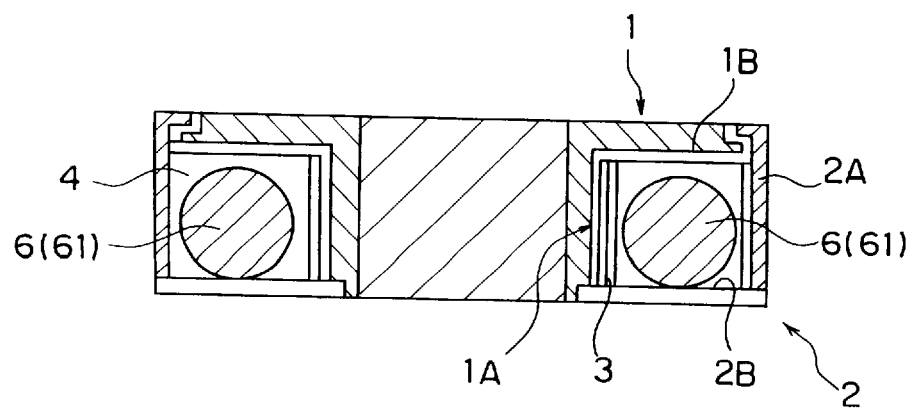
FIG. 4 is a sectional view along a line A—A of FIG. 3.

FIG. 3 and FIG. 4 show a first embodiment of the rotary connector of the prevent invention. FIG. 3 is a lateral sectional view of the rotary connector of this first embodiment, while FIG. 4 is a sectional view along the line A—A of FIG. 3.

As is illustrated in FIG. 3, the rotary connector is comprised of an inside case 1 and an outside case 2 arranged relatively rotatable with each other.

As is illustrated in FIG. 4, the inside case 1 has an outer circumference 1A for winding a flat cable 3 serving as the long object and a flange member 1B perpendicular to the outer circumference 1A. The outside case 2 has an inner circumference 2A facing the outer circumference 1A of the inside case 1 and a flange member 2B perpendicular to the inner circumference 2A. A space 4 having a rectangular cross-section is defined by the outer circumference 1A and flange member 1B of the inside case 1 and the inner circumference 2A and flange member 2B of the outside case 2. The space 4, as illustrated in FIG. 3, extends between the inside case 1 and the outside case 2 annularly along the outer circumference 1A of the inside case 1 and the inner circumference 2A of the outside case 2.

The space 4 accommodates the flat cable 3 having in the middle of its longitudinal direction a turnback portion 3A where it reverses in winding direction. One end of the flat cable 3 is fixed to a fixing portion 11 of the outer circumference of the inside case 1, while the other end of the flat cable 3 is fixed to a fixing portion 21 of the outside case 2. The space 4 further has inserted inside it a plurality of annular belts 5 between the outer circumference 1A of the inside case 1 and the inner circumference 2A of the outside case 2 along the outer circumference 2A of the inside case 1. Among the plurality of annular belts 5, there is an annular belt 5 arranged at the turnabout portion 3A of the flat cable 3.

These annular belts 5 are biased to the flat cable 3 to a direction of the outer circumference of the inside case 1 and inner circumference of the outside case 2. This prevents the part of the flat cable 3 wound on the inside case 1 and the part of the flat cable 3 wound against the outside case 2 from becoming loose and smooths the winding and rewinding of the flat cable 3. When inside case 1 or outside case 2 are rotated, the turnabout portion 3A of the flat cable 3 is moved to the same direction of the rotary connector, together with moving of the annular belts 5 to the same direction freely. The annular belts 5 have a predetermined elasticity and are produced so as to be able to deform between the outer circumference of the inside case and the inner circumference of the outside case and between the contact prevention members at the time of application of stress. The annular belts 5 are for example made of rubber or plastic such as polyethylene terephtalate.

Figure 1:
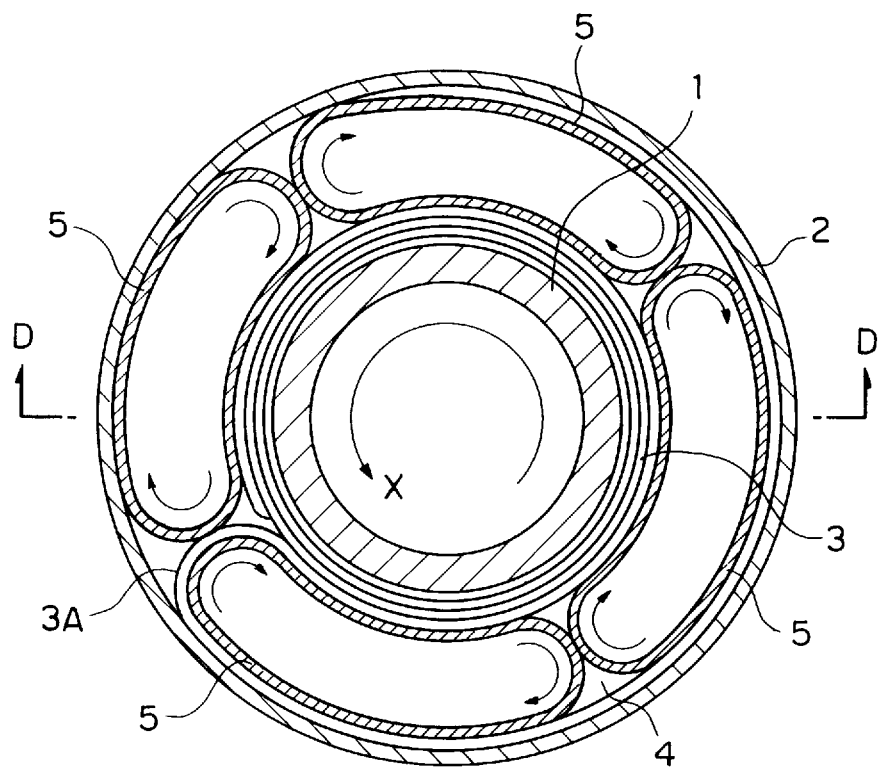
FIG. 1 is a lateral sectional view of a rotary connector of the related art.
Figure 2:
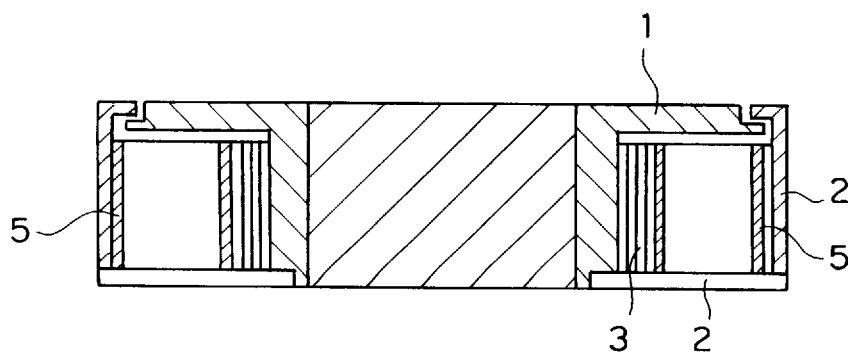
FIG. 2 is a sectional view along a line D—D of FIG. 2.

The structure of the rotary connector described above is basically the same as the rotary connector explained with reference to FIG. 1 and FIG. 2.

However, the rotary connector illustrated in FIG. 3 and FIG. 4 differ from the conventional rotary connector in that a plurality of contact prevention members 6 (first contact prevention members) are arranged between the adjoining annular belts 5 to prevent the adjoining annular belts 5 from coming into direct contact with each other. The contact prevention members 6 are accommodated in the rectangular cross-sectional space 4 defined by the outer circumference 1A and flange member 1B of the inside case 1 and the inner circumference 2A and flange member 2B of the outside case 2 as illustrated in FIG. 4. The contact prevention members 6 are further accommodated in the space 4 so as to be able to freely turn in the space 4 of the turnabout portion 3A of the flat cable 3 along the inner circumference 2A of the outside case 2 and the outer circumference 1A of the inside case 1.

The plurality of contact prevention members 6 are comprised of balls 61 formed by a material having a predetermined rigidity, for example, a rubber or plastic.

At least the portions of the contact prevention members 6 contacting the adjoining annular belts 5 are produced so as not to easily deform by the stress of the adjoining annular belts preferably.

The balls 61 serving as the contact prevention members, as clear from the illustration, are balls having a diameter somewhat smaller than the distance between the outer circumference 1A of the inside case 1 and the inner circumference 2A of the outer case 2 facing the outer circumference and having a diameter somewhat smaller than the distance between the flange member 1B of the inside case 1 and the flange member 2B of the outside case 2 facing that flange member. As a result, the balls 61 can freely rotate and move in the space 4.

The operation of the rotary connector of the first embodiment will be explained next.

When the inside case 1 is rotated in a direction of an arrow X (counterclockwise direction), flat cable 3 is wound in the inside case 1, and the turnabout portion 3A is moved to a direction of an arrow X, and the annular belts 5 and balls 61 are moved to the same direction. In this case, the adjoining annular belts 5 will indirectly contact each other via the contact prevention members 6 comprised of the balls 61, so the directions of rotation of the annular belts 5 and the contact prevention members 6 comprised of the balls 61 become reverse directions and the directions of rotation of the adjoining annular belts 5 will become the same. As a result, in the rotary connector of the first embodiment, the problem in the rotary connector explained with reference to FIG. 1 and FIG. 2 of the adjoining annular belts 5 directly contacting each other and therefore the directions of movement of the annular belts 5 becoming opposite from each other at the contact surfaces, the rotational torque becoming larger, and smooth rotation no longer being possible can be overcome and smooth rotation between the inside case 1 and the outside case 2 becomes possible. As a result, by turning the inside case 1, the part of the flat cable 3 wound against the outside case 2 can be smooth to smooth wind on the inside case 1 and the part of the flat cable 3 wound on the inside case 1 can be made to smooth wind against the outside case 2.

Further, the rotary connector of the second embodiment is easy to manufacture and is inexpensive in manufacturing costs.

Note that the rotary connector of the first embodiment is not increased in noise by the insertion of the contact prevention members 6.

Second Embodiment

Figure 5:
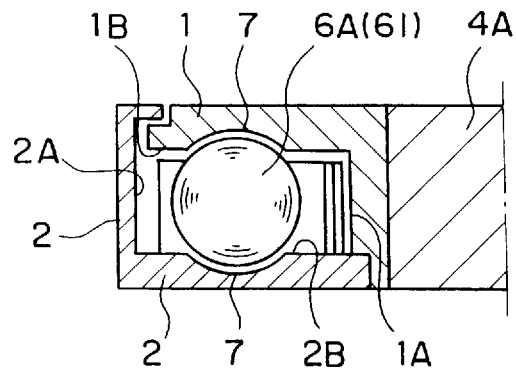
FIG. 5 is a longitudinal sectional view of key parts showing a second embodiment of the rotary connector of the present invention.

FIG. 5 is a longitudinal sectional view of key parts showing a second embodiment of the rotary connector of the present invention.

The structure of the rotary connector illustrated in FIG. 5 is basically the same as the rotary connector of the first embodiment, but differs from the rotary connector of the first embodiment in the following point.

In the rotary connector of this embodiment, a recess 7 is formed in the flange member 1B of the inside case 1 and a recess 7 is formed in the flange member 2B of the outside case 2 facing the recess 7. Therefore, the space 4A in this embodiment is note the rectangular cross-sectional space 4 illustrated in FIG. 4, but becomes the space 4A of a rectangular cross-section plus the recesses 7, 7. In this embodiment, specifically, contact prevention members (second contact prevention members) 6A comprised of balls 61 are sandwiched between the recesses 7, 7. The contact prevention members 6A comprised of the balls 61 are accommodated in a rotatable manner between the recess 7 of the flange member 1B of the inside case 1 and the recess 7 of the flange member 2B of the outside case 2.

The recesses 7, 7, as illustrated in FIG. 5, appear as partially circular recesses in cross-section in the flange member 2B of the outside case 2 and the flange member 1B of the inside case 1, but are formed annularly in the direction perpendicular to the surface of the paper in FIG. 5, that is, along the outer circumference 1A of the inside case 1 and the inner circumference 2A of the outside case 2, so as to enable the contact prevention members 6A (balls 61) to turn forward and backward.

That is, as clear from the illustrations, the balls 61 serving as the second contact prevention members 6A have diameters somewhat larger than the distance between the flange member 1B of the inside case 1 and the flange member 2B of the outside case 2 facing that flange member, the distance between the outer circumference 1A of the inside case 1 and the inner circumference 2A of the outside case 2 facing the outer circumference is larger than the diameter of the balls 61, the distance between the flange member 1B of the inside case 1 and the flange member 2B of the outside case 2 facing that flange member is smaller than the diameter of the balls 61, and recesses 7, 7 of partially circular cross-sections in which the balls 61 rotatable fit are formed in the inner surface of the flange member 1B of the inside case 1 and the inner surface of the flange member 2B of the outside case 2 annularly in the circumferential direction of the inside case 1 and outside case 2.

The material of the balls 61 is the same as the contact prevention members 6. The balls 61 are produced by a material having a certain degree of rigidity so that they will not deform due to the stress of the annular belts 5 at least at the portions coming into contact with the adjoining belts 5.

In the second embodiment as well, since the balls 61 serving as the second contact prevention members 6A are interposed between the adjoining annular belts 5 and prevent the adjoining annular belts 5 from coming into direct contact with each other, in the same way as in the first embodiment, smooth rotation of the rotary connector is possible. In particular. in the second embodiment, since the contact prevention members 6A comprised of the balls 61 are sandwiched between the recesses 7, 7 in addition to the features of the rotary connector of the first embodiment, the rotation of the second contact prevention members 6A comprised of the balls 61 becomes much smoother, so there is the advantage that smoother rotation of the rotary connector becomes possible. As a result, by turning the inside case 1, it is possible to more smoothly wind the part of the flat cable 3 wound against the outside case 2 on the inside case 1 and wind the part of the flat cable 3 wound on the inside case 1 against the outside case 2.

The rest of the effects and features of the rotary connector of the second embodiment are similar to the effects and features of the first embodiment.

Third Embodiment

Figure 6:
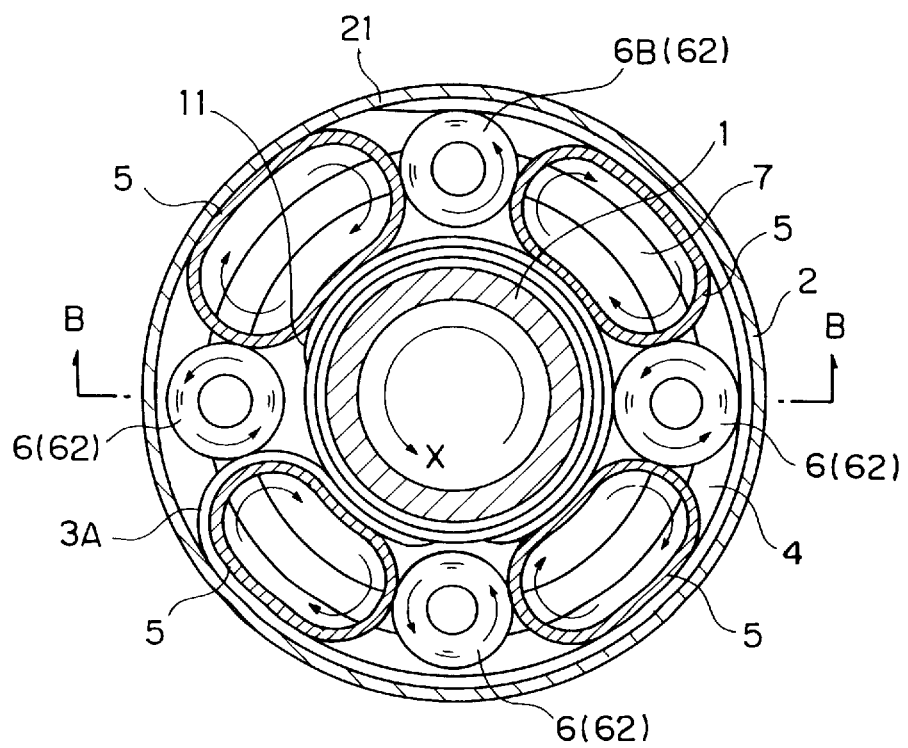
FIG. 6 is a lateral sectional view of a third embodiment of a rotary connector according to the prevent invention.
Figure 7:
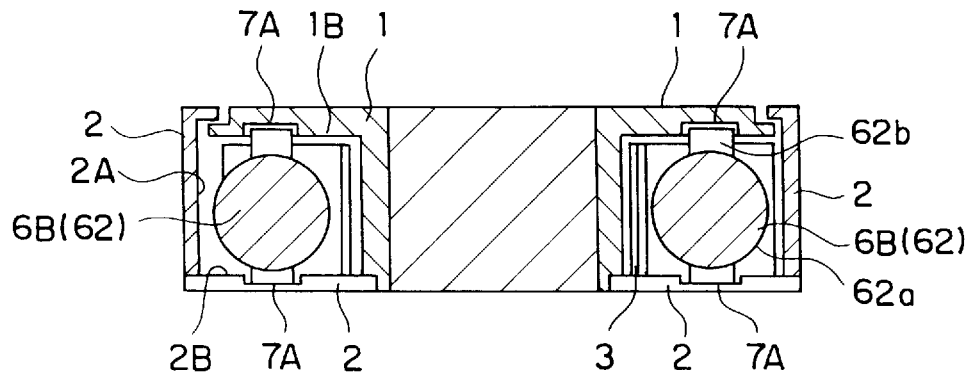
FIG. 7 is a sectional view along a line B—B of FIG. 6.
Figure 8:
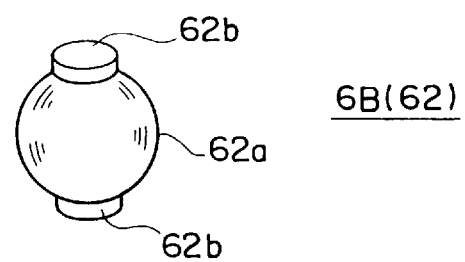
FIG. 8 is a perspective view of a shafted ball used as a third contact prevention member in the rotary connector illustrated in FIG. 7.

FIG. 6 is a lateral sectional view of a third embodiment of the rotary connector of the present invention, while FIG. 7 is a sectional view along the line B—B of FIG. 6. FIG. 8 is a perspective view of the shafted ball 62 serving as the third contact prevention member 6B illustrated in FIG. 7.

The rotary connector illustrated in FIG. 6 and FIG. 7 is the same in basic structure with the rotary connectors of the first embodiment and the second embodiment, but differs in the following point.

That is, the rotary connector of the third embodiment uses a shafted ball 62 as a third contact prevention member 6B. The shafted ball 62 serving as the third contact prevention member 6B, as illustrated in FIG. 8, is comprised of a center ball 62a provided with cylindrical shafts 62b projecting from the upper and lower portions. The cylindrical shafts 62b of this shafted ball 62 are made to face the flange member 1B of the inside case 1 and the flange member 2B of the outside case 2 and are positioned in the recesses 7A, 7A of the rectangular cross-sections shown in FIG. 7 provided annularly along a space of the inside walls of the inside case 1 and the outside case 2 illustrated in FIG. 6. This enables the shafted balls 62 to turn along the recesses 7A, 7A, so there is the advantage that smoother rotation of the contact prevention members 6B comprised of the shafted balls 62 becomes possible. As a result, by turning the inside case 1, it is possible to more smoothly wind the part of the flat cable 3 wound against the outside case 2 on the inside case 1 and wind the part of the flat cable 3 wound on the inside case 1 against the outside case 2.

The rest of the effects and features of the rotary connector of the third embodiment are similar to the effects and features of the first and second embodiments.

Note that as clear from the illustration, the distance between the outer circumference 1A of the inside case 1 and inner circumference 2A of the outside case 2 facing the outer circumference is larger than the diameter of the center ball 62A, the length between the two ends of the columnar shafts 62b, 62b is larger than the distance between the flange member 1B of the inside case 1 and the flange member 2B of the outside case 2 facing that flange member, and recesses 7A, 7A of rectangular cross-sections in which the ends of the two columnar shafts 62b, 62b fit in a manner movable in the circumferential direction of the inside case 1 are formed in the inner surface of the flange member 1B of the inside case 1 and the inner surface of the flange member 2B of the outside case 2 annularly in the circumferential direction of the inside case 1 and outside case 2.

Fourth Embodiment

Figure 9:
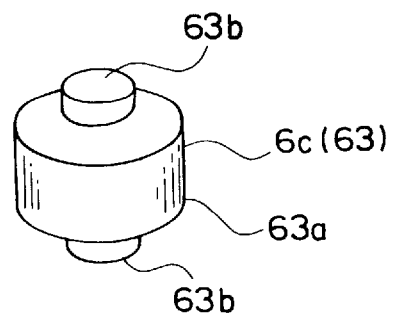
FIG. 9 is a perspective view of a fourth contact prevention member in a fourth embodiment of the rotary connector of the present invention.

FIG. 9 is a perspective view of a fourth contact prevention member 6C in a fourth embodiment of the rotary connector of the present invention.

The rotary connector of the fourth embodiment is basically the same in structure as the rotary connectors of the first to third embodiments, but differs in the point of using the shafted cylinder 63 as the fourth contact prevention member 6C. This shafted cylinder 63 is also used for the rotary connector illustrated in FIG. 7.

The shafted cylinder 63 is comprised of a cylinder 63a provided with cylindrical shafts 63b projecting from the upper and lower surfaces. The shafted cylinder 63 has a greater area of contact with the annular belts 5 compared with the shafted ball 62 illustrated in FIG. 8, so there is the advantage that easier rotation of the annular belts 5 becomes possible. As a result, by turning the inside case 1, it is possible to more smoothly wind the part of the flat cable 3 wound against the outside case 2 on the inside case 1 and wind the part of the flat cable 3 wound on the inside case 1 against the outside case 2.

The rest of the effects and features of the rotary connector of the fourth embodiment are similar to the effects and features of the first to third embodiments.

Note that as clear from the illustration, the distance between the outer circumference 1A of the inside case 1 and inner circumference 2A of the outside case 2 facing the outer circumference is larger than the diameter of the center cylinder 63a, the length between the two ends of the columnar shafts 63b, 63b is larger than the distance between the flange member 1B of the inside case 1 and the flange member 2B of the outside case 2 facing that flange member, and recesses of rectangular cross-sections in which the ends of the two columnar shafts 63b, 63b fit in a manner movable in the circumferential direction of the inside case 1 are formed in the inner surface of the flange member 1B of the inside case 1 and the inner surface of the flange member 2B of the outside case 2 annularly in the circumferential direction of the inside case 1 and outside case 2.

Fifth Embodiment

Figure 10:
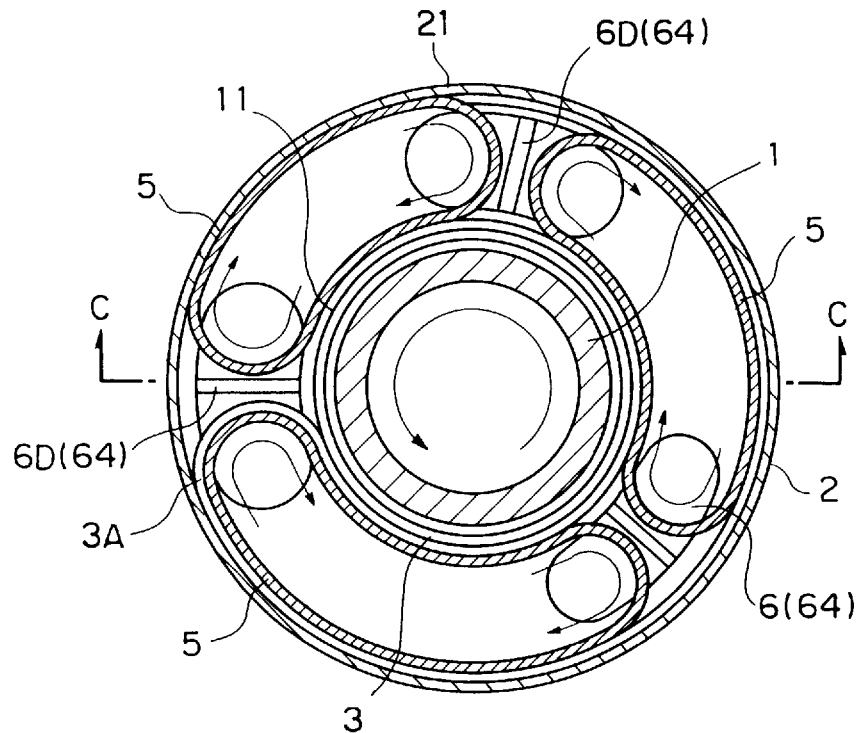
FIG. 10 is a longitudinal sectional view of key parts of a fifth embodiment of the rotary connector of the present invention.
Figure 11:
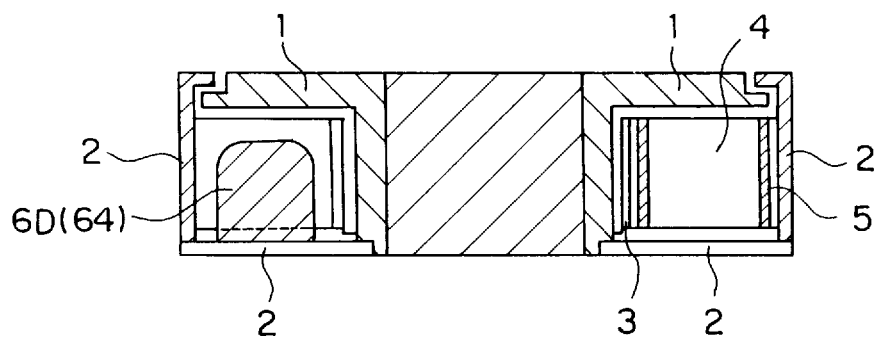
FIG. 11 is a sectional view along a line C—C of FIG. 10.

FIG. 10 is a longitudinal sectional view of key parts of a fifth embodiment of the rotary connector of the present invention; FIG. 11 is a sectional view along a line C—C of FIG. 10; and FIG. 12 is a perspective view of an inverted T-shaped member used as a contact prevention member illustrated in FIG. 10 and FIG. 11.

Figure 12:
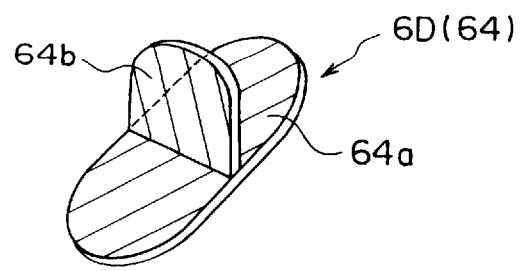
FIG. 12 is a perspective view of an inverted T-shaped member used as a contact prevention member illustrated in FIG. 10 and FIG. 11.

The rotary connector of the fifth embodiment is basically the same in structure as the rotary connectors of the first to fourth embodiments, but differs in the point of using the inverted T-shaped member 64 as shown in FIG. 12 as the fifth contact prevention member 6D.

This inverted T-shaped member 64 is comprised of an elliptically shaped base plate 64a provided with a tongue shaped perpendicular plate 64 from its center. As shown in FIG. 10 and FIG. 11, this is arranged so that the perpendicular plate 64b is positioned between the adjoining annular belts 5.

By arranging the fifth contact prevention members 6D comprised of the inverted T-shaped members 64 between the adjoining annular belts 5, it is possible to prevent the adjoining annular belts 5 from coming into direct contact with each other, so smooth rotation of the rotary connector is possible. As a result, by turning the inside case 1, it is possible to more smoothly wind the part of the flat cable 3 wound against the outside case 2 on the inside case 1 and wind the part of the flat cable 3 wound on the inside case 1 against the outside case 2.

The rest of the effects and features of the rotary connector of the fifth embodiment are similar to the effects and features of the first to fourth embodiments.

The contact prevention members used in the present invention are not limited to the structures of the above embodiments and may be any structures where the plurality of annular belts are prevented from coming into direct contact with each other.

Further, as the flat cable fixed to the inside case 1 and outside case 2 and pulled out from the rotary connector or rewound by rotation of the inside case 1 and outside case 2, one comprised not only of metal wires, but also optical fibers, that is, a flat optical cable, may also be used. Further, the cable used in the rotary connector of the present invention is not limited to a flat cable and may also be an ordinary cable or other long object so long as it can be wound and rewound between the inside case 1 and the outside case 2.

As explained above, the rotary connector of the present invention ensures smooth rotation between the inside case and outside case and smooth winding and rewinding of a long object such as a flat cable accommodated inside the rotary connector.

Further, the rotary connector of the present invention is simple in structure, is easy to manufacture, and can be used stably over a long period.

Further, the rotary connector of the present invention does not become noisy due to the insertion of the contact prevention members.

While the invention has been described with reference to specific embodiments chosen for purposes of illustration, it should be apparent that numerous modifications could be made thereto by those skilled in the art without departing from the basic concept and scope of the invention.

We claim:

1. A rotary connector, comprising:
   an inside case having an outer circumference of a circular cross-section and a flange perpendicular to the outer circumference;
   an outside case having an inner circumference of a circular cross-section arranged facing the outer circumference of the inside case a predetermined distance away from the same and a flange perpendicular to the inner circumference and positioned facing the flange of the inside case, surrounding the inside case, and arranged to be rotatable relative to the inside case;
   a space having a cross-section defined by the circular cross-section outer circumference of the inside case, the flange of the inside case, the circular cross-section inner circumference of the outside case, and the flange of the outside case and extending annularly along the circumferential direction of the inside case and the outside case;

a long object having one end fixed to the inside case, having another end fixed to the outside case, turned back in a U-shape inside the space, and accommodated in the space in a manner enabling winding on the outer circumference of the inside case and winding at the inner circumference of the outside case;

a plurality of annular belts provided in the space along the outer circumference of the circular cross-section inside case for biasing the parts of the long object wound on the inside case or the outside case to a direction of outer circumference of the inside case and inner circumference of the outside case in the space to prevent looseness of the long object in the space; and contact prevention members provided between adjoining annular belts for preventing adjoining annular belts from coming into direct contact with each other.

2. A rotary connector as set forth in claim 1, wherein the long object comprises a flat shape facing the outer circumference of the inside case.

3. A rotary connector as set forth in claim 2, wherein the long object comprises a flat cable.

4. A rotary connector as set forth in claim 1, wherein the annular belt has a predetermined elasticity and is produced so as to be able to deform between the outer circumference of the inside case and the inner circumference of the outside case and between the contact prevention members at the time of application of stress.

5. A rotary connector as set forth in claim 4, wherein the portion of a contact prevention member contacting an annular belt is formed by a material having rigidity so as not to deform by the stress of the adjoining annular belts.

6. A rotary connector as set forth in claim 5, wherein the contact prevention member is a ball having a diameter somewhat smaller than the distance between the outer circumference of the inside case and the inner circumference of the outer case facing the outer circumference and having a diameter somewhat smaller than the distance between the flange of the inside case and the flange of the outside case facing that flange.

7. A rotary connector as set forth in claim 5, wherein the contact prevention member comprises a ball having a diameter somewhat larger than the distance between the flange of the inside case and the flange of the outside case facing that flange, the distance between the outer circumference of the inside case and the inner circumference of the outside case facing the outer circumference is larger than the diameter of the ball, the distance between the flange of the inside case and the flange of the outside case facing that flange is smaller than the diameter of the ball, and recesses of partially circular cross-sections in which the balls rotatably fit are formed in the inner surface of the flange of the inside case and the inner surface of the flange of the outside case annularly in the circumferential direction inside case and outside case.

8. A rotary connector as set forth in claim 5, wherein the contact prevention member comprises a shafted ball comprised of a center ball with which adjoining annular belts contact and first and second columnar shafts connected at the two sides thereof and having diameters smaller than the diameter of the ball, the distance between the outer circumference of the inside case and the inner circumference of the outside case facing the outer circumference is larger than the diameter of the center ball, the length from the end of one columnar shaft of the shafted ball to the end of the other columnar shaft is larger than the distance between the flange of the inside case and the flange of the outside case facing that flange, and recesses of rectangular cross-sections in which the ends of the two columnar shafts fit in a manner movable in the circumferential direction of the inside case are formed in the inner surface of the flange of the inside case and the inner surface of the flange of the outside case annularly in the circumferential direction of the inside case and outside case.

9. A rotary connector as set forth in claim 5, wherein the contact prevention member comprises a shafted cylinder comprised of a center cylinder with which adjoining annular belts contact and first and second columnar shafts connected at the two sides thereof and having diameters smaller than the diameter of the cylinder, the distance between the outer circumference of the inside case and the inner circumference of the outside case facing the outer circumference is larger than the diameter of the center cylinder, the length from the end of one columnar shaft of the shafted cylinder to the end of the other columnar shaft is larger than the distance between the flange of the inside case and the flange of the outside case facing that flange, and recesses of rectangular cross-sections in which the two columnar shafts fit in a manner movable in the circumferential direction of the inside case are formed in the inner surface of the flange of the inside case and the inner surface of the flange of the outside case annularly in the circumferential direction of the inside case and outside case.

10. A rotary connector as set forth in claim 5, wherein the contact prevention member is an inverted T-shaped plate member having a perpendicular plate with which the adjoining annular shafts contact and a plate which affixes the perpendicular plate in a direction perpendicular to the same and is inserted between the sides of the adjoining annular belts and the flange of the inside case or the flange of the outside case.

* * * * *